United States Patent [19]

Booy

[11] 4,063,717
[45] Dec. 20, 1977

[54] MULTIVENTED TWIN-SCREW EXTRUDER

[75] Inventor: Max Lorens Booy, Wilmington, Del.

[73] Assignee: E. I. Du Pont de Nemours and Company, Wilmington, Del.

[21] Appl. No.: 764,579

[22] Filed: Feb. 1, 1977

[51] Int. Cl.² .............................................. B29B 1/10
[52] U.S. Cl. .................................... 366/75; 159/2 E; 366/83
[58] Field of Search ........................ 259/192, 6, 21, 41, 259/104; 159/2 E; 264/102, 349; 425/203, 204, 208; 55/191, 261

[56] References Cited
U.S. PATENT DOCUMENTS

| 3,371,379 | 3/1968 | Reifenhauser | 159/2 E X |
| 3,612,141 | 10/1971 | Ocker | 159/2 E |
| 3,630,689 | 12/1971 | Wheeler et al. | 259/6 X |
| 3,992,500 | 11/1976 | Kruder et al. | 425/203 X |

Primary Examiner—Philip R. Coe

[57] ABSTRACT

A gaseous phase disengaging apparatus for a liquid phase process material contaminated with a substance of lower boiling point comprising a twin screw extruder through which the raw feed is passed and within which the feed is repetitively spread over the apparatus inside surfaces and thereafter recombined, which apparatus is provided with paired raw material supply inlets and gaseous phase vent ports maintained in continuous communication therebetween during screw rotation.

8 Claims, 17 Drawing Figures

MULTIVENTED TWIN-SCREW EXTRUDER

BRIEF SUMMARY OF THE INVENTION

Generally, this invention relates to a gaseous phase disengaging apparatus for a liquid phase process material having process material entrance and discharge ends, a housing provided with a pair of overlapping cylindrical axially parallel bores each provided with substantially identical co-rotating helical screws advancing the process material toward the discharge end, the helical screws being in relatively close clearance with the bores for the full transverse extent of the bores except in the regions where the bores overlap, throughout which overlap region the screws interact in individual screw tip to peripheral expanse proximity, liquid phase raw process material inlet ports opening sequentially into each screw channel of the apparatus and axially spaced outside and intermediate gaseous phase vent ports opening internally into continuous communication with each apparatus material-advancing passage, the center-to-center axial spacing $S_v$ between the outside vent ports expressed in terms of $t$ = lead of screw, $R_s$ = outside radius of screw, $R_v$ = radius of vent port, $n_T$ = number of tips of each screw and $\gamma$ = the outward angular inclination of the vent ports from normality with respect to the plane including the axes of the screws, being such that $$S_v = t/2 \, (2 - 3/n_T) + (t/\pi) \cos^{-1}(1 - R_v/R_s) - \gamma t/\pi$$

where as intermediate vent ports are axially disposed at approximately equal intermediate spacings between the outside exhaust ports.

DRAWINGS

The following drawings constitute part of this specification, in which.

BACKGROUND

Co-rotating twin-screw polymer processing apparatus is used extensively in the chemical industry, originally to extrude solid phase polymers and mixtures but also, more recently, as melt-fed reactors. In this latter use a problem exists in the handling of lowviscosity feed streams containing large quantities of vaporizable material in that an entrainment action may occur, causing foaming or flooding at the vent ports during the course of vapor disengagement.

To a considerable degree, this problem, which can contribute to polymer degradation, can be alleviated by the use of long-lead screws in combination with proper reactor inlet and vent port placement, and this invention is directed to such a design.

THE INVENTION

The screw configurations preferred for polymer processing are of helical constant lead design in order to transport polymer in a controllable quasi plug-flow manner to the discharge zone. Such screws are normally made as close-fitting as practical design permits, thereby providing a fully self-wiping action with respect to all apparatus internal surfaces, thus avoiding dead zones and the attendant build-up of degraded polymer.

In addition to long-lead screws, there are commercially available paddle-type screws having an infinite lead or pitch, i.e., a 90° helix angle. Under certain conditions, these paddle screws can handle high vapor loadings at acceptable pressure-drop levels.

It will be understood that the pressure drops for flow of gases must be small when vented twin screw processors operate at low pressures. Pressure drop is proportional to the length of the helical path followed by the gases, and it is strongly influenced by the cross-sectional area perpendicular to the escape path, so that a large cross-sectional area for vapor transport is desirable.

It is apparent that the path of gas travel is shortest and the cross-sectional passage area the maximum when screws have 90° helix angles, as is the case in the paddle-type design. However, the paddle design has certain disadvantages, e.g., from a residence-time distribution and control standpoint helical screws are preferred when the application requires minimal long term liquid hold-up. Accordingly, proper feed and vent port locations become critical features.

It is a primary object of this invention to provide an optimum apparatus and method of venting a twin-screw polymer processing apparatus in terms of uniform distribution of gas flows together with the minimization of pressure drops and the elimination of pulsations, thereby minimizing the entrainment of liquid particles. The objectives can be achieved by application of the following criteria:

1. All process material passages must be vented at all times. (By "passage" is meant the completely closed chambers that exist between adjacent screw flights and the enclosing walls, wherein the processed liquid phase material is contained, best seen in FIGS. 2 and 4A to 4E. For correct understanding, it must be borne in mind that the "screw channels" consist of the grooves between adjacent screw tips, i.e. $2n_T$ where $n_T$ = the number of screw tips, whereas the "material-advancing passages" are $2n_T - 1$ in number.)

2. Exhaust vents should have diameters, $D_v$, which effect substantially equal volatile material removal over a given period of time. In usual processing, this is effected by simply providing uniform vent port diameters; however, it has been found that, generally, vent port diameters can vary by up to about ± 50% while still achieving the benefits of the invention. The paramount condition to be satisfied is the prevention of entrainment through the vent ports, which can, in given instances, be attained even if the vent ports have varied cross-sectional areas and shapes.

3. All vent ports are preferably disposed vertically with respect to a horizontal plane inclusive of the two screw axes, and vent ports located at the intersection of this horizontal plane and the barrels are preferably disposed inwardly of, and substantially, tangent (at their extremes) to, the housing bores, as seen best in FIGS. 1B, 2, 3, 6, 8 and 9. Despite this, if the particular use requires, outwardly slanted vent ports, the axes of which can be inclined outwardly away from the vertical by an angle $\gamma$ of up to about 30°, as illustrated in FIG. 7, can be utilized.

4. Vent port and inlet port openings must not be completely closed by a screw tip in any position assumed by the screws in the course of their rotation, as shown most clearly in FIGS. 3, 4A to 4E, 6, 8 and 9, and 5. The axial distance between vent ports is preferably a minimum for a given barrel diameter, screw lead and number of screw tips; however, this is not absolutely necessary.

Essentially then, this invention comprises a devolatilizing apparatus employed to devolatilize fluid mixtures comprising a horizontally-disposed fully-wiped enclosure, a co-rotating twin-screw assembly employing a pair of multi-tipped self-wiping screw elements, the flights of which screws form with the walls of the enclosure a plurality of passages extending longitudinally of the enclosure having: (1) a feed supply inlet opening into each of the passages and (2) a plurality of vent ports in the enclosure communicating at all times, through the process material passages, with the feed supply inlets, the geometric centers of adjacent vent ports being approximately equidistantly spaced and lying in a plane diagonally intersecting the enclosure axes (refer FIGS. 3, 6, 8 and 9) such that the axial spacing between the extreme vent port centers is at a minimum, while providing simultaneous venting at all times for each passage by each associated vent port.

Referring to FIGS. 1, 1B, 2, 3 and 4A–4E particularly, the apparatus denoted generally at 10 comprises a conventional housing 11 provided internally with overlapping cylindrical axial bores 14 and 15, which, between them, present an approximate numeral 8 bore configuration in transverse cross-section.

Figure 1:
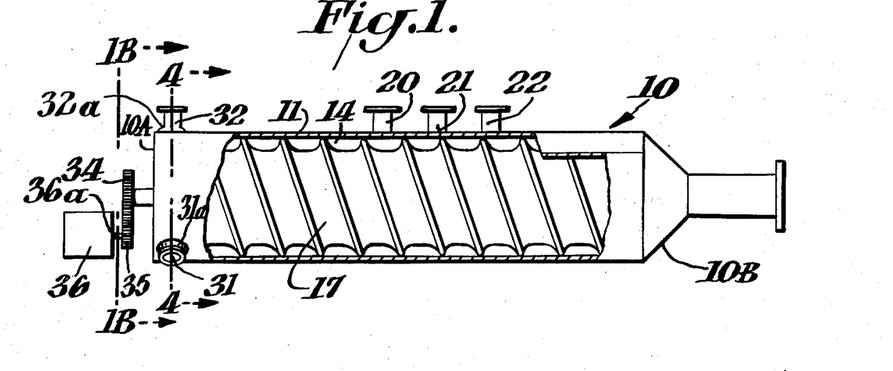
FIG. 1 is a partially broken longitudinal sectional view of a preferred embodiment of this invention embodying a pair of left-hand helical screws, each having two tips.
Figures 1B, 2:
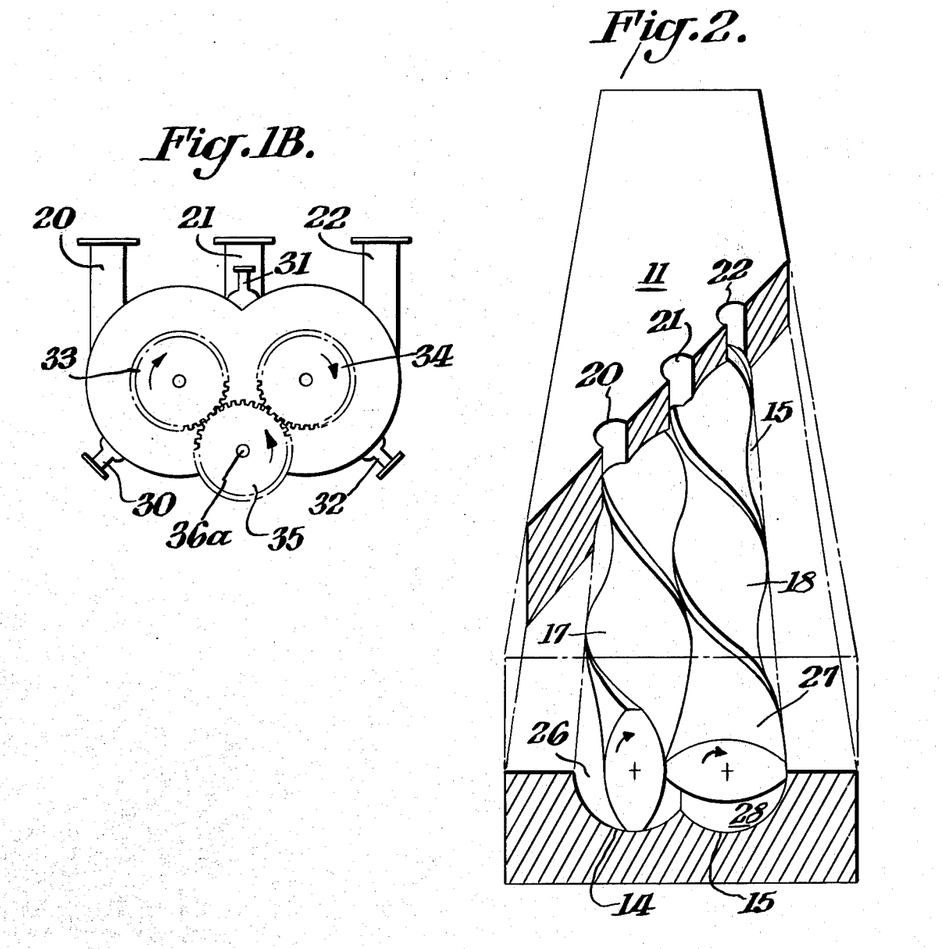
FIG. 1B is an end view taken on line 1B—1B of FIG. 1, showing the preferred embodiment of FIG. 4E.
FIG. 2 is a broken sectional view taken along the central horizontal transverse plane of the complete apparatus of FIG. 1 illustrating in perspective the interaction of said helical screws.

Each bore is provided with a close-fitting constant lead substantially identical two-tipped helical extruder screw 17 and 18, having equal helix angles in the range of about 10° to about 75°, the tips of each of which approach the peripheral expanse of the other throughout the angle of screw overlap, beyond which the screw tips continue to slide past their associated bore walls throughout the balance of their rotations. In this connection, practical design considerations necessitate affording clearances between confronting machine elements, sometimes as much as ¼ inch (0.64 cm), to forestall gouging contact therebetween, especially taking into account substantial lateral screw deflections occurring during heavy commercial service.

Screws 17 and 18 (in this instance left-hand threaded) are gear-driven in the same direction (in this instance clockwise, as seen from the entrance end) and, of course, at the same rotational speeds, typically, 40 rpm, so that they collectively advance the polymeric loading in process from the entrance end 10A of the apparatus to the discharge end 10B.

In the course of operation, process material fed in at the entrance end, 10A, is subjected to intensive layer spreading over the inside bore walls followed by frequent interfolding. As a result, large scale gaseous phase disengagement occurs, particularly if a low absolute pressure is applied to the vent ports 20, 21 and 22.

In order to facilitate gaseous phase disengagement, and prevent foaming difficulties, it is preferred that the process material introduced into the apparatus at any given time not exceed about 75% of the apparatus void space. It will be understood that this void space constitutes the sum of the passages defined by successive screw flights, which, to afford unimpeded escape of gaseous phase material which it is desired to flash off, must be in continuous open communication with both the process material inlet ports and vent ports.

Figure 3:
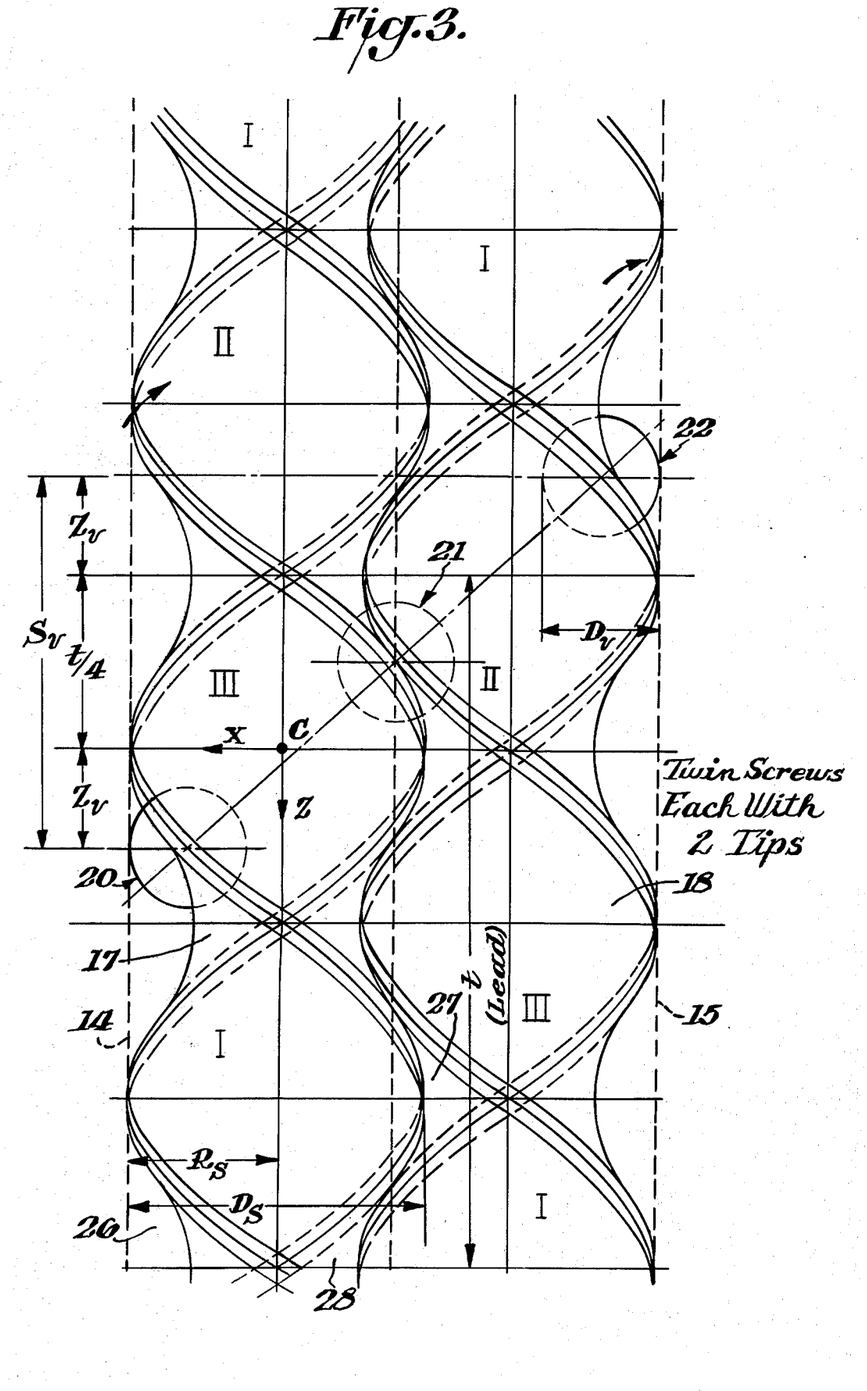
FIG. 3 is a plan view of the twin screw-boreexhaust vent relationship of the apparatus of FIGS. 1 and 2, FIGS. 4A–4E are schematic end view of bore and screw profiles only taken on line 4—4 of FIG. 1 for a complete apparatus showing five possible inlet orientations, of which that of FIG. 4E is especially preferred.

Referring to FIG. 3, the expression for the equation of the projected helix through the center of the tip is: $x = R_s \cos(2\pi z/t)$, where $x$ and $z$ are two of the three mutually normal coordinates measured from origin C, $t$ = the screw lead and $R_s$ = the outside radius of the screw.

The center of the left-hand outside exhaust port 20 of radius $R_v$ then has an $x$ coordinate of $$x_v = R_s - R_v = R_s \cos(2\pi z_v/t) \text{ or } z_v = (t/2\pi)\cos^{-1}(1 - R_v/R_s) \tag{1a}$$

The axial distance $S_v$ between the two outside exhaust ports 20 and 22 is then $S_v = t/4 + 2z_v$ which, if $\sigma_v = S_v/t$, $\rho_p = R_v/R_s = D_v/D_s$, can be written $\sigma_v = \frac{1}{4} + (1/\pi)\cos^{-1}(1 - \rho_v)$.

In tabular form, the following dimensionless relationships apply:

| $\rho_v = \dfrac{D_v}{D_s}$ | $\sigma_v = \dfrac{S_v}{t}$ | $\rho_v = \dfrac{D_v}{D_s}$ | $\sigma_v = \dfrac{S_v}{t}$ |
|---|---|---|---|
| 0.0 | 0.250 | 0.6 | 0.619 |
| 0.1 | 0.393 | 0.7 | 0.653 |
| 0.2 | 0.455 | 0.8 | 0.686 |
| 0.3 | 0.503 | 0.9 | 0.718 |
| 0.4 | 0.545 | 1.0 | 0.750 |
| 0.5 | 0.583 | | |

Once the outside vent ports 20 and 22 are located, intermediate exhaust port 21 is simply placed halfway between its outside counterparts.

It will be seen (in FIG. 3) that exhaust ports 20, 21 and 22 are each in continous communication with a given process material passage (denoted I, II and III), although, in transition between ajacent screw flight channels, a given vent port overlies two screw flight channels simultaneously. Any one screw flight channel is thereby provided with approximately the same total vent port area at all times, less, of course, the relatively small thicknesses of blade tips.

Figure 6:
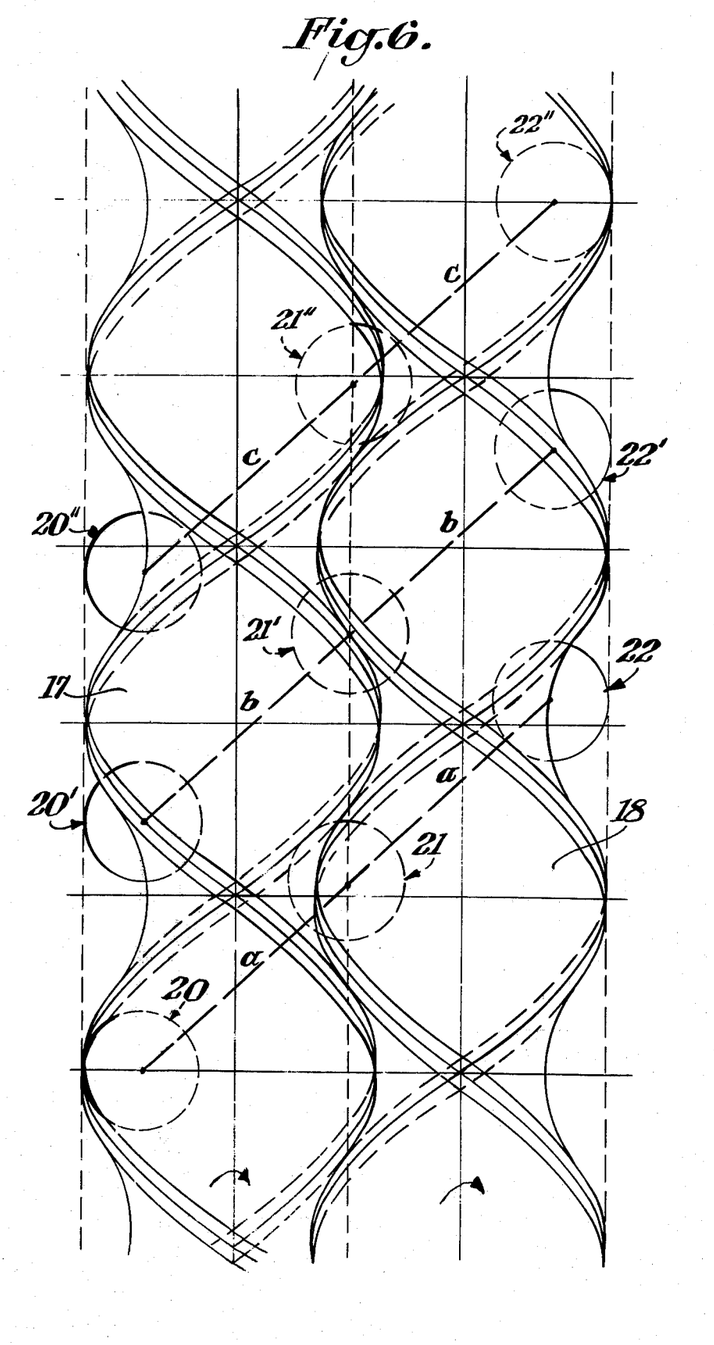
FIG. 6 is a plan view of the terminal end of the apparatus of FIG. 4E showing the progressive relationship of screw tips to vent ports during clockwise advance of the screws from diagonal $aa$ to diagonal $cc$.
Figure 7:
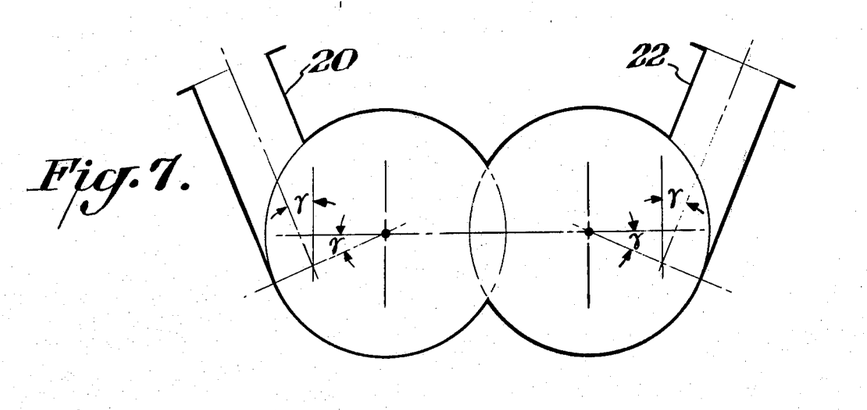
FIG. 7 is a diagrammatic cross-sectional view of a second embodiment of apparatus utilizing outwardly inclined exhaust vents.

The progressive relationship of vent ports 20, 21 and 22 with respect to the tips of screws 17 and 18 during clockwise rotation as viewed from the lower edge of the FIGURE is illustrated in FIG. 6, wherein the starting position is as portrayed by diagonal aa. At 135° advance of the screws the relative vent port positions are denoted as 20', 21' and 22' disposed along diagonal bb. Finally, at 135° further advance, i.e., upon completion of ¾ of one full rotation (i.e. at 270°), the relative vent port positions are at 20'', 21'' and 22'' spaced along diagonal cc. Study of these successive vent position views shows that there is provision for continuous, equalized venting through each of the three vent ports during full screw rotation, thereby maintaining low pressure drops over each process material passage as well as uniform escape flow of material vaporized off during screw advance.

Figure 4A:
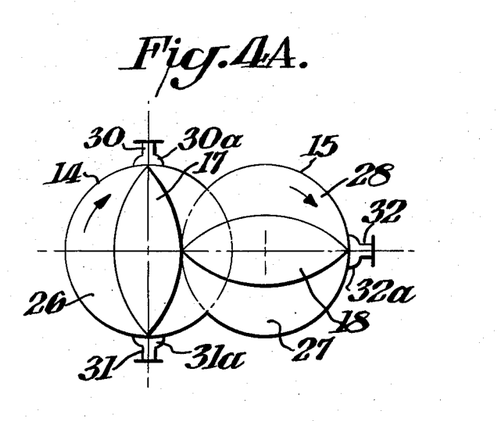
Figure 4B:
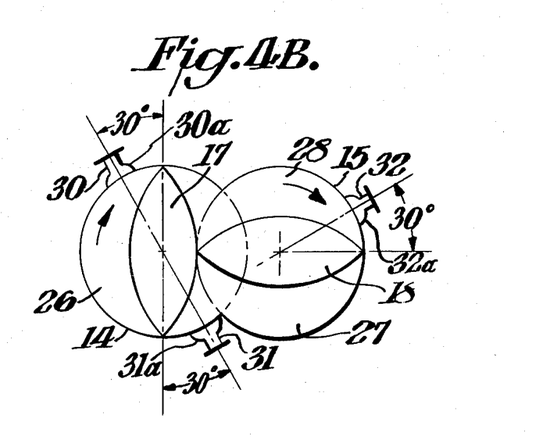
Figure 4C:
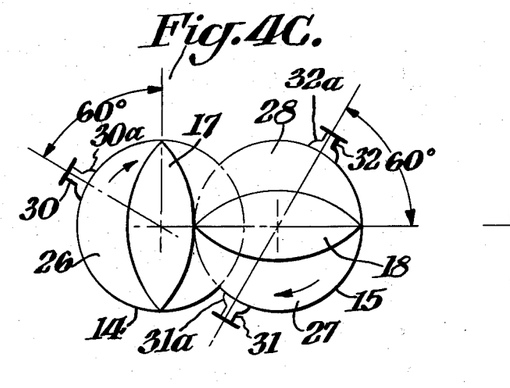
Figure 4D:
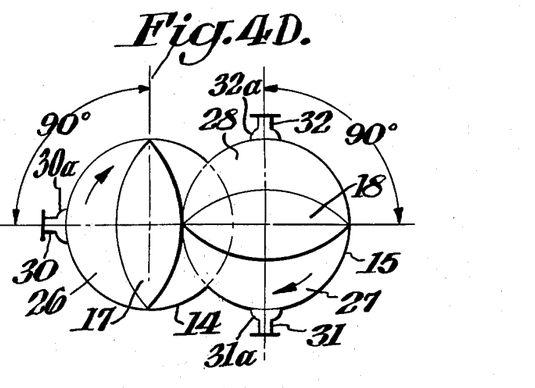
Figure 4E:
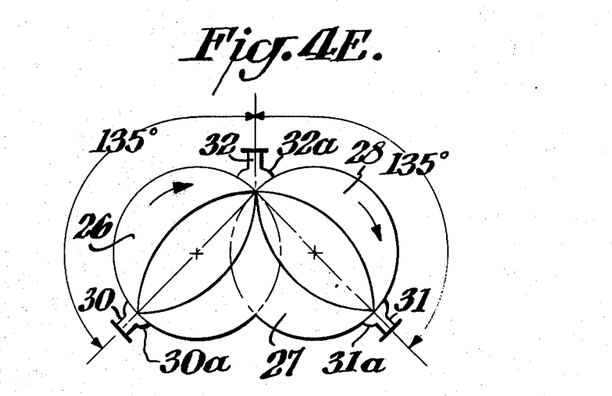

As seen in FIG. 2, and also in FIGS. 4A and 4E, inclusive, a twin 2-tipped extruder screw apparatus according to this invention defines three process material passages 26, 27 and 28 having periodically equal cross-sectional areas.

Referring to FIGS. 4A–4E particularly, individual radially disposed process material inlets 30, 31 and 32 are provided for each process material passage 26, 27 and 28, these being spaced peripherally at preselected angular intervals in the same rotational senses with respect to the tips of screws 17 and 18, i.e., at 30°, 60°, 90° and 135° angles for FIGS. 4B, 4C, 4D and 4E, respectively, or spanning two adjacent flight channels equally on opposite sides of the screw tips as shown in FIGS. 4A and 4E.

The inlets are preferably counter-bored on their inside ends (e.g., at 30a, 31a and 32a, FIGS. 4A–4E) opening into bores 14 and 15 in order to present substantially equal inlet-to-bore flow resistances independent of screw tip position.

Screws 17 and 18 are power-driven in the same directions, e.g., clockwise in the views of FIGS. 1, 1B, 2, 3 and 4A–4E as viewed from the entrance end 10A, by drive gears 33 and 34 via gear 35 which is direct-connected to the gear shaft 36a of motor 36, the usual reducing gears being omitted. Conventional thrust bearings (not shown) are provided near the screw entrance end 10A.

Figure 9:
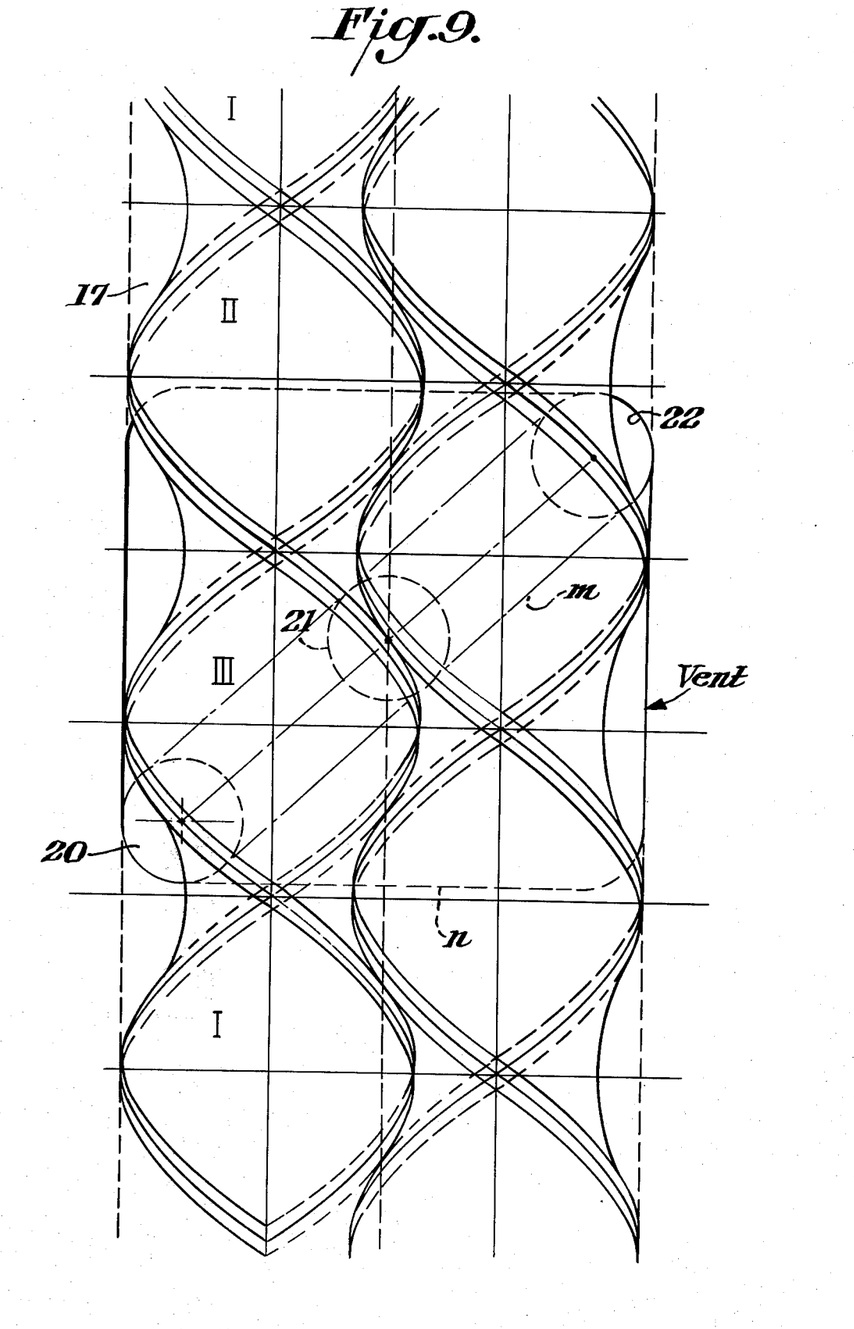
FIG. 9 is a plan view corresponding to FIG. 3 illustrating design variations effecting merger of the three exhaust ports in ($m$) as a single diagonal slot and in ($n$) as an encompassing square cut-out.

It is practicable to merge the multiplicity of vents 20, 21 and 22 into a single diagonal slot such as the delineated region denoted m in FIG. 9, or even to expand the total venting area by cutting away a complete projected square of the casing wall top surface, as denoted broken outline n. While a desirable increase in vent port area is obtained by such artifices, there is simultaneously incurred a countervailing disadvantage in that the bore working surface is correspondingly reduced. This reduces the capability for volatile material disengagement, a factor which should be taken into account for the specific service contemplated.

Figure 8:
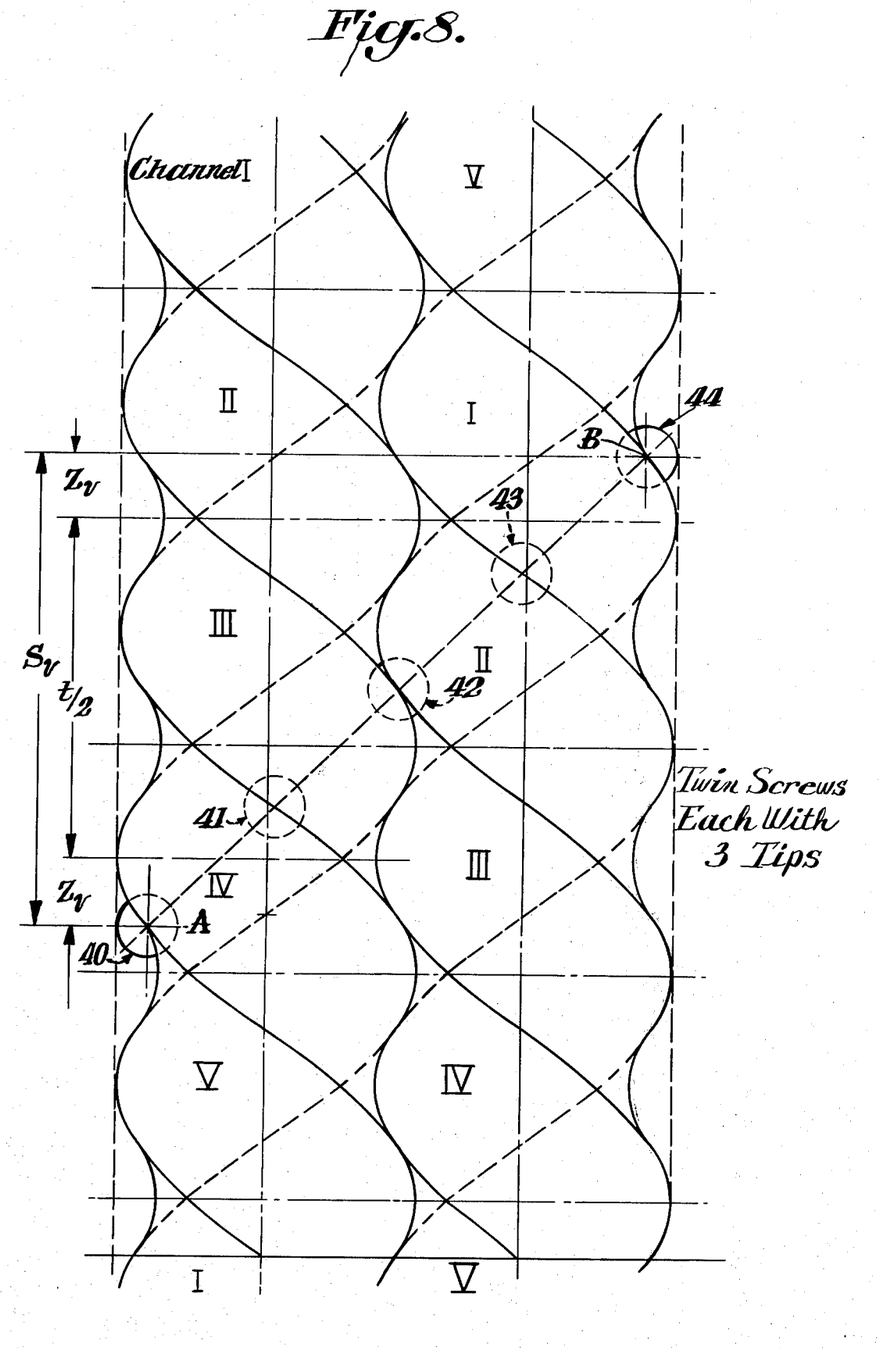
FIG. 8 is a plan view corresponding to FIG. 3 of a second embodiment of apparatus utilizing twin screws each having three tips.

Referring to FIG. 8, it is, of course, possible to utilize the invention with screws having multiple tips in excess of two, and this FIGURE shows five vent ports 40, 41, 42, 43 and 44 disposed along diagonal AB for a design of twin-screw extruder having three tips per screw.

Here there exist five separate material advancing passages, each denoted by Roman numerals I to V, inclusive, shown in relationship to the vent ports serving each individually.

A general mathematical expression for the spacing $S_v$ between outside vents such as 40 and 44, FIG. 8, can be written as: $S_v = t/2\,(2 - 3/n_T) + (t/\pi)\cos^{-1}(l - R_v/R_s)$ wherein, again, $t =$ the screw lead, $R_v =$ the radius of the vent ports, $R_s =$ the radius of the extruder screws, and $n_T =$ the number of screw tips.

This equation is modified in simple manner to accommodate offset outer vent ports such as those portrayed in FIG. 7, where the angle of outward inclination $= \gamma$, to the following form:

$$S_v = t/2\,(2 - 3/n_T) + (t/\pi)\cos^{-1}(1 - R_v/R_s) - \gamma t/\pi,$$

all terms being as hereinbefore defined.

The derivation of the foregoing basic equation is as follows:

Vent ports must be located so that all passages between the screws and barrels are in communication with the inlets at all times. This condition exists when all centers of screw tips intersect vent port center lines at the same instant. The exception is the center vent port, which must be so located that the center vent port straddles the two touching tips of the mating screws as shown at B, FIG. 5A.

Figure 5A:
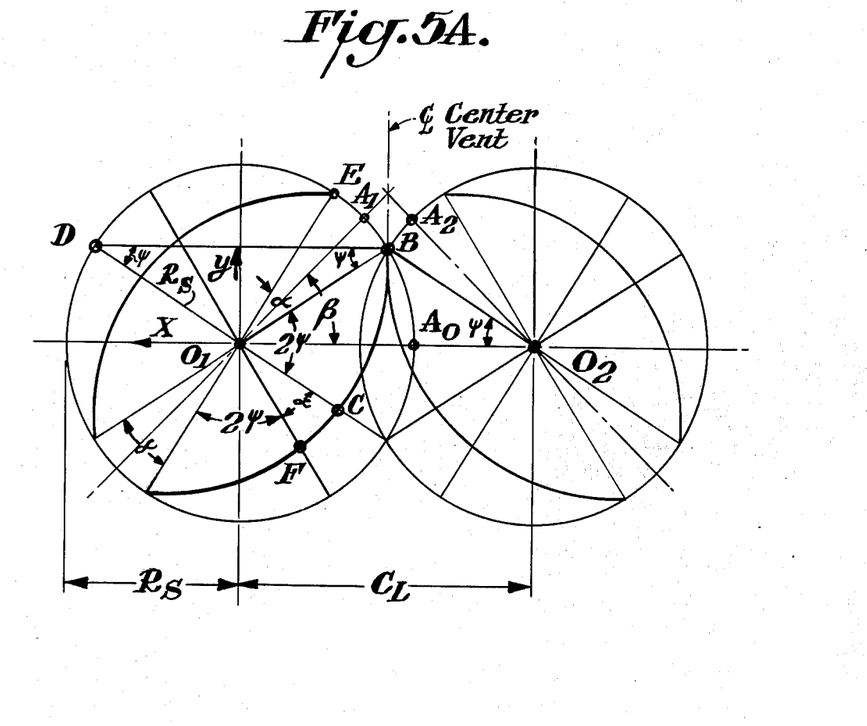
FIG. 5A is a diagrammatic end view in which critical angles are denoted.

For all other screw tips, the concern is with the tip centers, or with the helical curves through the centers of tips $A_1$ and $A_2$ of FIG. 5A, and with corresponding curves for the other tips. Point $A_1$ is a point midway between the tip ends B and E. The radial line through $A_1$ is at an angle $\beta$ from the horizontal plane.

The radius of arc BC is equal to the centerline distance $O_1O_2 = C_L$. Thus, triangles $O_1O_2B$ and $DBO_1$ are congruent, and angles $BDO_1$ and $BO_1O_2$ are equal, hereinafter denoted $\psi$. Further, $<BO_1C = 2\psi$. Then, let tip angle $EO_1B = \alpha$. Summing the angles around $O_1$, the case for $n_T = 2$ can be written:

$$2(2\alpha + 4\psi) = 360° = 2\pi. \qquad (1),$$

or more generally, $$n_T(2\alpha + 4\psi) = 2\pi. \qquad (2)$$

Then, also:

$$\alpha/2 + \psi = \pi/2n_T \qquad (3)$$

This angle is precisely the angle $\beta$, so from (2,3)

$$\beta = \pi/2n_T \qquad (4).$$

Figure 5B:
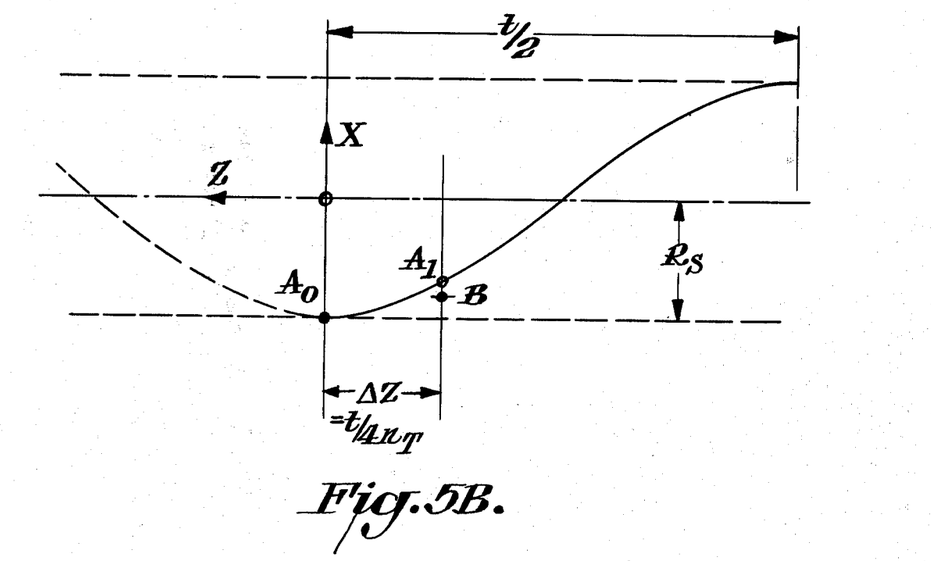
FIG. 5B is a projection of the helical (tip) curve through point $A_1$ of FIG. 5A.

FIG. 5B shows the projection of the helical curve through $A_1 \cdot A_o$ of FIG. 5A is another point on the helical curve through $A_1$. The projection of the helical curve is a cosine curve which is easier defined when $z = 0$ referred to the plane through $A_o$. That projection is then:

$$x = -R_s \cos(2\pi z/t) \qquad (5)$$

The center vent is at B in the plane where:

$$z = \beta t/2\pi = t/4n_T \qquad (6)$$

Figure 5C:
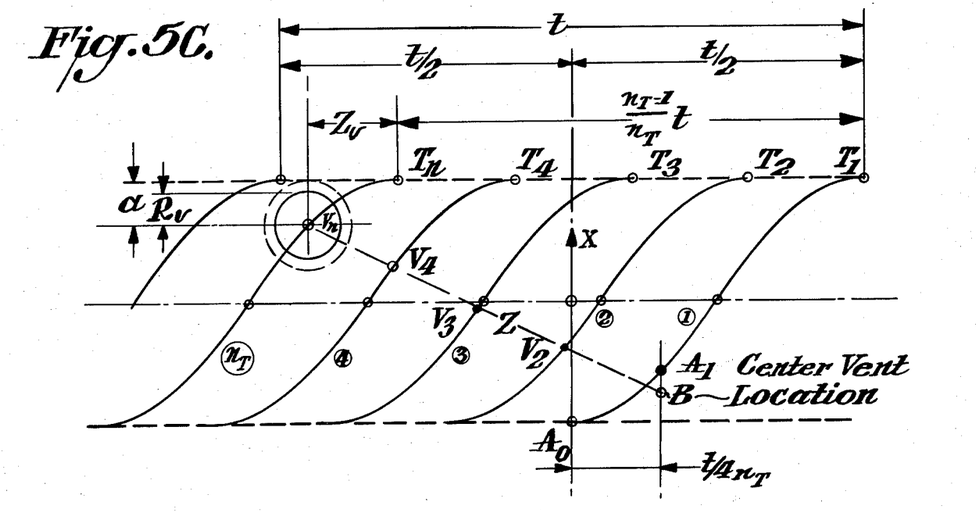
FIG. 5C is a projection of mid-tip helices for a screw having $n_T$ tips.

FIG. 5C shows projections of helical curves through $A_1$ and through corresponding mid-tip points for a left-handed screw. These helical projections are numbered ①②③ ... $n_T$. There must be a vent centerline intersecting each of these helices, so that the last vent must have its centerline intersecting the helix denoted ⓝ$_T$. The axial distance $z_v$ between the latter vent and the extreme point $T_n$ on that helix is given by equation 1a. The axial distance between $T_1$ and $T_2$ is:

$$\Delta T_1 T_n = (n_T - 1)/n_T \qquad (7)$$

Thus, the axial distance between the center vent B and each outside vent is:

$$\Delta BV_n = z_v + \frac{n_T - 1}{n_T} t - \frac{t}{2} + \frac{t}{4n_T}$$

$$= z_v + \left(\frac{t}{4}\right)\left(2 - \frac{3}{n_t}\right) \qquad (8)$$

The distance between the two outside vents becomes:

$$S_v = 2z_v + (t/2)(2 - 3/n_T) \qquad (9).$$

Figure 5D:
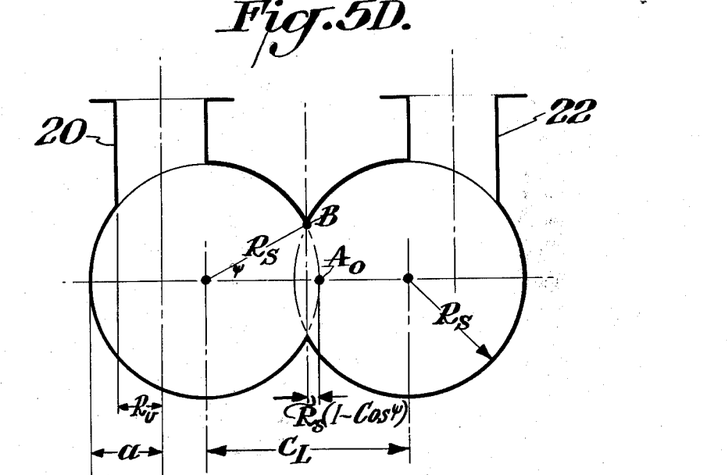
FIG. 5D is an end diagram showing the general relationship of the outside vertically disposed exhaust vents for the general arrangement of FIGS. 5A–5C.

Equation (1a) for $z_v$ was derived for cylindrical vents having a cylindrical passage that osculates the bore, and also having a vent centerline perpendicular to the plane through the two screw axes. It is more general to denote the normal distance $a$ from the centerline to the bore and employ a vent radius $R_v \leq a$, as shown in FIG. 5D. The distance $z_v$ then becomes:

$$z_v = (t/2\pi)\cos^{-1}(1 - a/R_s) \qquad (10).$$

The correction for slanted vents must then be introduced, so that:

$$S_v = (t/2)(2 - 3/n_T) + (t/\pi)\cos^{-1}(1 - a/R_s) - (\gamma/\pi)t$$

The foregoing equations define the axial distance between outside vents. The center vent is located midway between the two outside vents. This completely describes the relative locations of the three vents for the case $n_T = 2$.

For the case where $n_T > 2$, the locations of the intermediate vents must be such that the vent centerlines of all vents intersect a midpoint helix at the same instant. In the following, it is assumed that the centerlines of intermediate vents are all normal to the plane through the two screw axes.

Thus, in FIG. 5C, intermediate vent locations $V_2$, $V_3$, and $V_4$ have vent centerlines that intersect the mid-tip helices at the same instant. These all lie very nearly on a straight line connecting $V_n$ with point B, but any continuous curve approaching a straight line can be substituted. The axial distances between adjacent vent ports are not constant when vent centerlines lie on a straight line $BV_n$, except where $n_T = 2$.

In the unusual case where $n_T > 2$, there is some freedom in the selection of the location of the intermediate vents, but vents should all be located near the line connecting B and $V_n$, and on the projection of the helices of FIG. 5C.

EXAMPLE

A twin (two-tipped) demonstration extruder screw apparatus having leads measuring 21.75 inches (55.25 cm) was made utilizing a transparent polymeric casing. The apparatus was provided with three vent ports distributed along its length to match the tips of screws with helix angles of approximately 60°, or a screw lead of 21.75 inches (55.25 cm) as hereinbefore taught.

A separate inlet flange was equipped with three inlets in a plane perpendicular to the axes of the screws and spaced as shown in FIG. 4E, so that the center lines of the inlets 30, 31 and 32 coincide with the midpoints of the screw tips at the same instant. The inlets were very nearly at the start of the processing screws 17 and 18, in that there was only a nominal, approximately 1/16 inch (1.6 mm), axial clearance at the entrance end.

Tests were conducted with a mixture of approximately 20 poise viscosity polybutene and air simulating nylon inlet conditions carrying a 10% steam loading. The 4 inches (100 mm) diameter unit was tested at 5 rpm, i.e., 25.5 lb/hr (11.6 kg/hr) liquid rate, 5 cfm air (8.5 m³/hr).

Previous tests using only a single vent port 21 (with vent ports 20 and 22 plugged shut) showed massive air entrainment in the product. With all three vent ports 20, 21 and 22 carried open, there was little or no entrainment and operation was vastly improved. There existed some pulsation, because the inlets were not counter-bored and thus had inside diameters very nearly equal to the tips of the screws.

Additional details of apparatus dimensions are functions of the particular parameters chosen for the process application to be performed.

Thus, as regards the optimum number of screw turns $\lambda$, the following equation in screw length L, screw diameter $D_s$ and helix angle $\phi$, is applicable:

$$\lambda = \frac{L}{t} = \frac{L}{\pi D_s \tan \phi}.$$

Approximate maximum number of turns, based on $(L/D_s) = 16$ and helix angle $\phi = 17°$, is 50 turns. Approximate minimum number of turns based on $(L/D_s) = 8$ and $\phi = 75°$ is 2.2 turns.

As regards the inlet diameters 30, 31 and 32 these are preferably in the range of about $D_s/100$ to about $D_s/4$, depending upon what value of jetting velocity it is desired to accommodate at the entrance end of the apparatus, together with existing upstream process conditions.

On the basis of a rather broad application to widely different process materials, the diameters of the vent ports 20, 21 and 22 can be preselected to be in the general range from about $D_s/20$ to about $3D_s/4$.

Finally, the depths of the screw channels are functions of the screw diameters, $D_s$, and are determined as follows:

For two-tipped screws, the thread depths are approximately $0.22 \times D_s$, whereas three-tipped screws require channel depths of $0.08 \times D_s$.

What is claimed is:

1. In a gaseous phase disengaging apparatus for a liquid phase process material having process material entrance and discharge ends, a housing provided with a pair of overlapping cylindrical axially parallel bores each provided with substantially identical co-rotating helical screws advancing said process material toward said discharge end, said helical screws being in relatively close clearance with said bores for the full transverse extent of said bores except in the region where said bores overlap, throughout which overlap region said screws interact in individual screw tip to peripheral expanse proximity, liquid phase raw process material inlet port opening sequentially into each screw channel of said apparatus and axially spaced outside and intermediate gaseous phase vent ports of radius $R_v$, opening internally into continuous communication with each apparatus material advancing passage, the axis of said outside vent ports being disposed inwardly of the housing bores by an amount a such that $R_v \leq a$, the center-to-center axial spacing $S_v$ between said outside ports expressed in terms of $t$ = lead of screw, $R_s$ = outside radius of screw, $R_v$ = radius of said vent ports, $n_T$ = number of tips and $\gamma$ = the outward angular inclination of said vent ports from normality with respect to the plane including the axes of said screws, being such that $S_v = t/2 (2 - 3/n_T) + (t/\pi) \cos^{-1}(1 - a/R_s) - (\gamma t/\pi)$ whereas said intermediate vent ports are axially disposed at approximately equal intermediate spacings between said outside vent ports.

2. An apparatus according to claim 1 wherein $\gamma$ is an angle from 0° to about 30°.

3. Apparatus according to claim 1 wherein said gaseous vent ports are merged into a single diagonal slot by removal of the intervening metal of said housing walls along the upper arc joining said ports.

4. Apparatus according to claim 1 wherein the helix angle of said screw extruders is in the range of about 10° to about 75°.

5. Apparatus according to claim 1 wherein the number of complete screw turns ranges from about 2 to about 50.

6. Apparatus according to claim 1 wherein the inlet port diameters vary from about $D_s/100$ to about $D_s/4$, where $D_s$ = the screw diameter.

7. Apparatus according to claim 1 wherein the vent port diameters vary from about $D_s/20$ to about $3 D_s/4$.

8. Apparatus according to claim 1 wherein the depths of the screw channels are approximately 0.22 $D_s$ for two-tipped screws and approximately 0.08 $D_s$ for three-tipped screws, where $D_s$ = the screw diameter.

* * * * *

UNITED STATES PATENT OFFICE
CERTIFICATE OF CORRECTION

PATENT NO. : 4,063,717
DATED : December 20, 1977
INVENTOR(S) : Max Lorens Booy

It is certified that error appears in the above-identified patent and that said Letters Patent are hereby corrected as shown below:

Col. 5, line 24 - "and", second occurrence, should read --to--.
Col. 7, equation (8) - "$n_t$" should be --$n_T$--.
Col. 9, line 6 - "a", first occurrence, should be italicized.

Signed and Sealed this

Fourth Day of April 1978

[SEAL]

Attest:

RUTH C. MASON
Attesting Officer

LUTRELLE F. PARKER
Acting Commissioner of Patents and Trademarks